United States Patent
Neumann

[19]

[11] Patent Number: 5,851,387
[45] Date of Patent: Dec. 22, 1998

[54] FILTER PLATE FEED PORT CLAMP

[75] Inventor: Reuben G. Neumann, Midvale, Utah

[73] Assignee: Baker Hughes Incorporated, Houston, Tex.

[21] Appl. No.: 837,715

[22] Filed: Apr. 22, 1997

Related U.S. Application Data

[63] Continuation of Ser. No. 495,365, Jun. 28, 1995, abandoned.

[51] Int. Cl.⁶ .................................................. B01D 25/176
[52] U.S. Cl. .......................... 210/229; 210/230; 277/640; 277/644; 277/651
[58] Field of Search .................................... 210/224, 227, 210/228, 229, 230, 231; 403/237, 364, 408.1; 277/178, 193, 199, 235 R, 640, 644, 651; 100/197

[56] References Cited

U.S. PATENT DOCUMENTS

| | | | |
|---|---|---|---|
| 3,087,298 | 4/1963 | Luke et al. | 210/230 |
| 3,503,326 | 3/1970 | Juhasz et al. | |
| 4,741,826 | 5/1988 | Geuenich et al. | |
| 5,362,388 | 11/1994 | Bonn | |

FOREIGN PATENT DOCUMENTS

| | | | |
|---|---|---|---|
| 33942 | 1/1908 | Australia | 210/224 |
| 2155909 | 7/1987 | Japan | 210/224 |
| 6238006 | 8/1987 | Japan | |
| 975662 | 11/1984 | United Kingdom | |

Primary Examiner—Matthew O. Savage
Attorney, Agent, or Firm—Trask, Britt & Rossa

[57] ABSTRACT

A feed port clamp member is disclosed for placement through and about the feed port of a filter plate to provide an abrasion-resistant surface through the feed port of the filter plate to prevent degradation of the underlying filter media and filter plate during high pressure and/or high temperature flow conditions of solids-containing filtration fluid through the feed port. The feed port clamp member is reinforced to provide stability to the feed port clamp member and to assure a secure seal between the feed port clamp member and the filter media. The feed port clamp member provides an improved means of protecting the filter plate and filter media under challenging flow conditions, particularly when the filtration fluid contains non-mineral solids components. The feed port clamp member may be a unitary member or may be comprised of interlocking rings which have mateable non-linear edges which engage one another to provide a secure seal against infiltration of fluid through and beneath the feed port clamp member.

11 Claims, 6 Drawing Sheets

FILTER PLATE FEED PORT CLAMP

This application is a continuation of U.S. patent application Ser. No. 08/495,365 filed on Jun. 28, 1995, now abandoned.

BACKGROUND

1. Field of the Invention

This invention relates to filter press plates used to produce filter cakes, and relates more specifically to feed port fastening members which are configured for placement about the feed port of a filter plate.

2. Statement of the Related Art

Filter presses are used in various industries to produce a filter cake of solid material which remains after the fluid component of a slurry or solids-containing fluid is filtered out. Filter presses typically comprise a plurality of stacked or adjacently positioned filter plates which are configured to provide a space between each adjacent plate. Filter plates generally comprise a substantially planar plate having a frame positioned about the periphery of the plate, a feed port for introduction of a solids-containing fluid into the system, and means for directing fluid away from the filter plate during formation of the filter cake. Filter media, usually comprising a porous cloth or material, is typically used to line the surfaces of the filter plate so that the solids material is trapped between two adjacently positioned surfaces of filter media. A slurry or solids-containing fluid is introduced, usually at high pressures, through the feed ports and into the space formed between adjacent plates. Solid matter is trapped within the space while the fluid is filtered through the filter media and is drained away from the filter plate.

The feed port formed through a filter plate is subject to degradation due to the flow of solids-containing fluids through the feed port. The solids-containing fluid may contain solid matter which is either naturally abrasive or which is rendered abrasive under high pressure flow conditions. Additionally, the solids-containing fluid may be caustic or acidic, leading to chemical degradation of the filter plate, filter media or any other structure associated with the feed port.

Annular structures configured to encircle the feed port of a filter plate have been described in the prior art for the purpose of stabilizing the feed port opening or for providing a means for securing the filter media to the filter plate. Such annular structures may often be referred to as clips, clamps or rings. Examples of such feed port structures are disclosed in U.K. Patent No. 975,662 to Evans; U.S. Pat. No. 3,503, 326 to Juhasz; German Patent No. 2,025,994 to Hansen, et al.; U.S. Pat. No. 4,741,826 to Geuenich; and U.S. Pat. No. 5,362,388 to Bonn.

Some fastening structures are constructed to permit placement of the filter media over the fastening structure and through the feed port. However, such configurations usually result in degradation or wearing of the filter media (also referred to herein as the "filter cloth"), especially in the area of the feed port opening. Other fastening structures are configured for placement of the filter media between the fastening structure and the filter plate, but are inadequate in providing a complete seal between the fastening structure and the filter plate. As a result, filtration fluid may seep through or around the fastening structure, leading to undesirable filtration in that area, degradation of the filter media in that area and eventual degradation of the filter plate.

In view of the feed port fastening structures disclosed in the prior art, it would be advantageous to provide a clamp which is abrasion-resistant and configured to provide a secure seal about the feed port of a filter plate to prevent degradation of the filter plate and the filter media in the area of the feed port.

SUMMARY OF THE INVENTION

In accordance with the present invention, a feed port clamp member positionable about the feed port of a filter plate is structured to provide an abrasion-resistant covering about and through the feed port to protect the underlying filter media and filter plate from degradation. Additionally, the feed port clamp member is constructed to provide a secure seal about the periphery of the feed port clamp member to prevent filtration about the feed port clamp member and infiltration of solids-containing fluid between the feed port clamp member and the filter media. The feed port clamp member may be used in connection with the feed port of any suitable filter plate, including a membrane filter plate, but is described hereinafter in terms of use in connection with a filter plate, by way of example.

The feed port clamp member is made of any suitable abrasion-resistant material which renders the feed port clamp member substantially chemical-resistant and capable of withstanding high temperatures and pressures without degrading or deforming. Most suitably, the feed port clamp member may be made of an elastomer having the identified characteristics rendering it suitable for use in the filtration of many types of solids-containing fluids or slurries, particularly non-mineral slurries. The feed port clamp member includes a circumferential face which corresponds to the inner annular surface of the feed port of a filter plate and is positionable thereagainst. The circumferential face of the feed port clamp member extends between the opposing sides of the filter plate. The circumferential face is positioned within the feed port to provide a direct interface with fluid moving through the feed port.

Two parallel spaced-apart sides, or flanges, extend outwardly from the circumferential face of the feed port clamp member at a substantially perpendicular angle thereto. Each of the two parallel flanges of the feed port clamp member is oriented against one of the opposing sides of the filter plate and each flange encircles the feed port. A substantially continuous outer surface is provided between the two parallel flanges and the circumferential face to present an abrasion-resistant surface against which solids-containing fluids flow. Each of the two parallel flanges has an inner surface which is oriented toward the filter plate, and is positioned against the filter cloth, which is in turn positioned against the filter plate.

The feed port clamp member of the present invention also includes reinforcement members oriented along the two parallel flanges or sides of the feed port clamp member. Additionally, the reinforcement members may be oriented along the circumferential face of the feed port clamp member. The reinforcement members provide added stability to the feed port clamp member under high pressure flow conditions. Further, the reinforcement members oriented along the parallel flanges of the feed port clamp member, in combination with the inner surface of the flanges, provide a secure seal between the feed port clamp member and the filter media. The secure seal thus provided acts as a gasket to prevent undesirable filtration about the feed port clamp member and to prevent infiltration of fluid between the feed port clamp member and the filter media, thereby preventing damage to the filter media and the underlying filter plate. In typical industry applications, that portion of the filter media which surrounds the feed port is usually painted with a surface sealant which renders the filter media substantially non-porous and protected from the abrasive or caustic filtration fluid. The gasket seal provided by the feed port clamp member of the present invention eliminates the need to treat the filter media, thereby reducing costs and preparation time. Additionally, more filtration surface is available when the filter media is not treated as described.

The reinforcement members may be positioned in any suitable location relative to the abrasion-resistant material, but in a particularly suitable construction, the abrasion-resistant material of the feed port clamp member is formed about the reinforcement members to enclose the reinforcement members therewithin. The reinforcement members may be formed as a continuous ring of material which is oriented to surround the feed port of the filter plate. Alternatively, the reinforcement members may comprise sections or portions of material which are oriented to surround the feed port of the filter plate. The reinforcement members are made from any suitably hardened material which provides sufficient hardness and strength to provide rigidity and stability to the feed port clamp member. Particularly suitable materials include steel or stainless steel.

The feed port clamp member is most suitably formed from two interlocking rings, each ring separately comprising a circumferential face and a flange extending outwardly therefrom. The circumferential face of each of the two interlocking rings has a non-linear edge which is formed to mate with and engage the non-linear edge of the other interlocking ring. Thus, when the two interlocking rings are positioned, respectively, against the opposing sides of the filter plate and the circumferential faces are oriented within the feed port opening, the mateable non-linear edges of the two interlocking rings engage and form a secure seal therebetween, thereby preventing infiltration of fluid and other material between the two interlocking rings. The two interlocking rings of the feed port clamp member facilitate the positioning of the feed port clamp member through and about the feed port of the filter plate, and facilitate placement of the filter media between the filter plate and the flanges of the feed port clamp member.

The feed port clamp member is secured to the filter plate by securement members which extend through one parallel flange, through the filter media and filter plate, and through the second parallel flange. The securement members may be any suitable device which maintains the feed port clamp member about the feed port of the filter plate, and may include bolts, rivets, screws or the like. The securement members may be positioned through the flanges of the feed port clamp member such that the extreme ends of the securement members are recessed below the outer surface of the flanges. Alternatively, the extreme end or ends of the securement members may be positioned through the flanges so that a portion of the securement members extends outwardly from the outer surface of the flanges. In that alternative embodiment, the outwardly extending ends of the securement members may act as spacing and stabilizing means between adjacently positioned feed port clamp members.

The feed port clamp member may optionally be formed with raised protuberances extending outwardly from the outer surface of one or more of the two parallel flanges to provide a contact surface with an adjacent feed port clamp member. The raised protuberances, or bosses, provide stability of the filter plate about the area of the feed port, thereby preventing distortion of the filter plate due to high pressure flow conditions. Additionally, the raised protuberances provide channels along the outer surface of the flanges through which filtration fluid or slurry moves into the space formed between adjacent filter plates.

BRIEF DESCRIPTION OF THE DRAWINGS

In the drawings, which illustrate what is currently considered to be the best mode for carrying out the invention.

DETAILED DESCRIPTION OF THE ILLUSTRATED EMBODIMENTS

Figure 1:
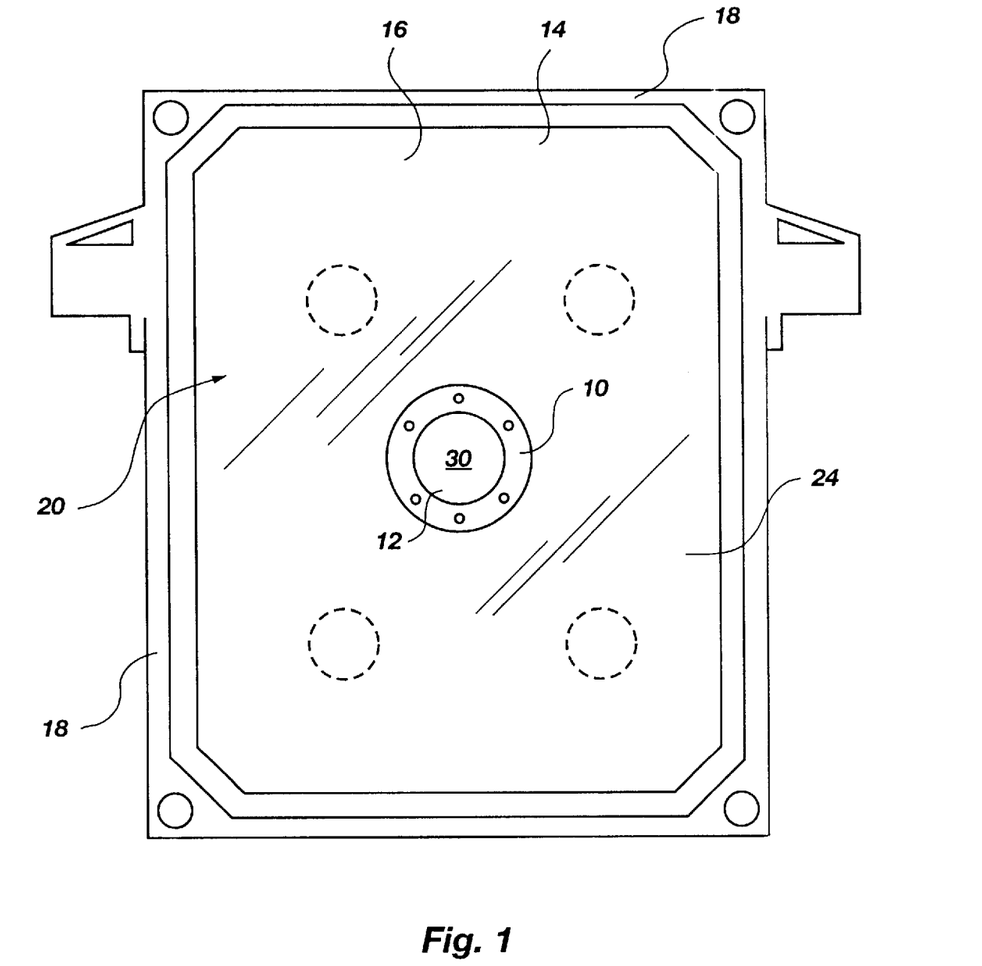
FIG. 1 is a view in elevation of a filter plate illustrating attachment of a feed port clamp member about the feed port of the filter plate.

The structure and positioning of the feed port clamp member 10 through and about the feed port 12 of a filter plate 14 is illustrated in FIG. 1, which illustrates one example of a filter plate 14. The filter plate 14 comprises a substantially planar body 16 having a first side 20 and a second side 22 (FIG. 2) in opposing orientation to the first side 20. A frame 18 surrounds the planar body 16 of the filter plate 14 and extends outwardly relative to the first side 20 and second side 22 so that the first side 20 and second side 22 are recessed relative to the frame 18. Filter media 24, in the form of a porous filter cloth, is positioned over the planar body 16 of the filter plate 14.

Figure 2:
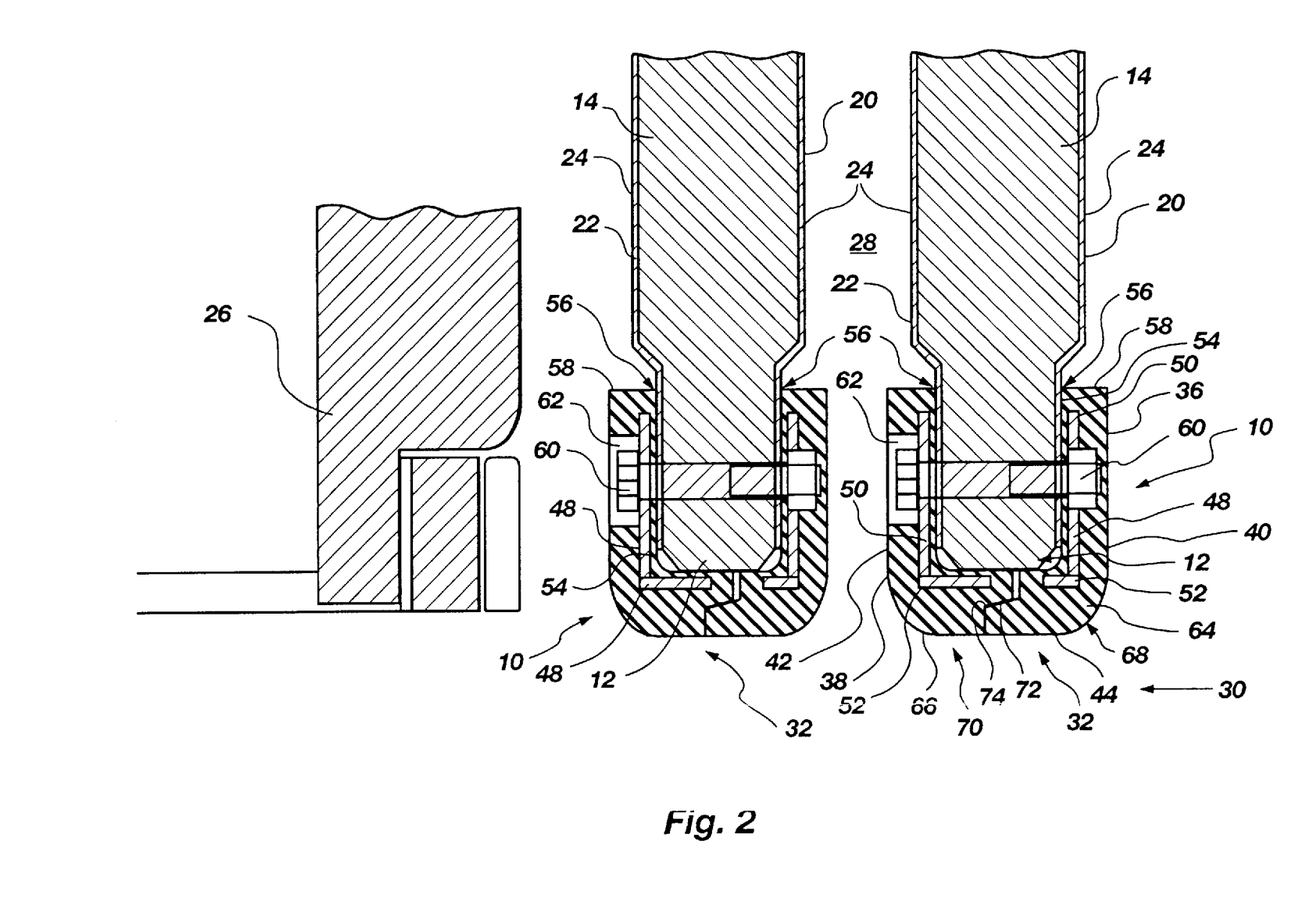
FIG. 2 is a view in cross section of a portion of two adjacent filter plates, each having a first embodiment of a feed port clamp member positioned about the feed port of the filter plate, and a liner plate positioned for reference against one of the filter plates.

In a filter press assembly, as suggested by FIG. 2, a plurality of filter plates 14 is positioned adjacent each other in a stacked configuration, and may be stacked adjacent one or more liner plates 26. When stacked adjacent to each other, a space 28 is formed between two adjacent filter plates 14. Solids-containing filtration fluid or slurry is pumped through the opening 30 formed through the feed port 12, usually under high pressure. The fluid moves between adjacent feed port clamp members 10 and into the space 28 formed between adjacent filter plates 14. The filter media 24 covering the first side 20 and second side 22 of the filter plate 14 traps the solid matter therebetween, and fluid which filters through the filter media 24 is drained off through channels (not shown) formed in the planar body 16 of the filter plate 14.

The feed port 12 of the filter plate 14 may be typically formed as a round opening extending through the planar body 16 of the filter plate 14, as illustrated in the present drawings. However, the feed port may be any other suitable shape or geometry, such as a square or oval shape, and the feed port clamp member 10 is accordingly sized and shaped to conform to the selected shape or geometry of the feed port 12.

The feed port clamp member 10 includes a circumferential face 32 which is positioned against the feed port 12 of the filter plate 14 and extends from the first side 20 of the filter plate 14 to the second side 22 of the filter plate 14. The circumferential face 32 of the feed port clamp member 10 is positioned within the feed port 12 to interface directly with influent filtration fluids or slurries. A first parallel side or flange 36 extends outwardly from the circumferential face 32 and at a substantially perpendicular angle thereto. The first parallel flange 36 is oriented toward the first side 20 of the filter plate 14 and surrounds the feed port 12 of the filter plate 14. A second parallel side or flange 38 extends outwardly from the circumferential face 32 and at a substantially perpendicular angle thereto. The second parallel flange 38 is oriented toward the second side 22 of the filter plate 14 and surrounds the feed port 12. The outer surface 40 of the first parallel flange 36 and the outer surface 42 of the second parallel flange 38 form a substantially continuous, abrasion-resistant surface with the outer surface 44 of the circumferential face 32.

Figure 3:
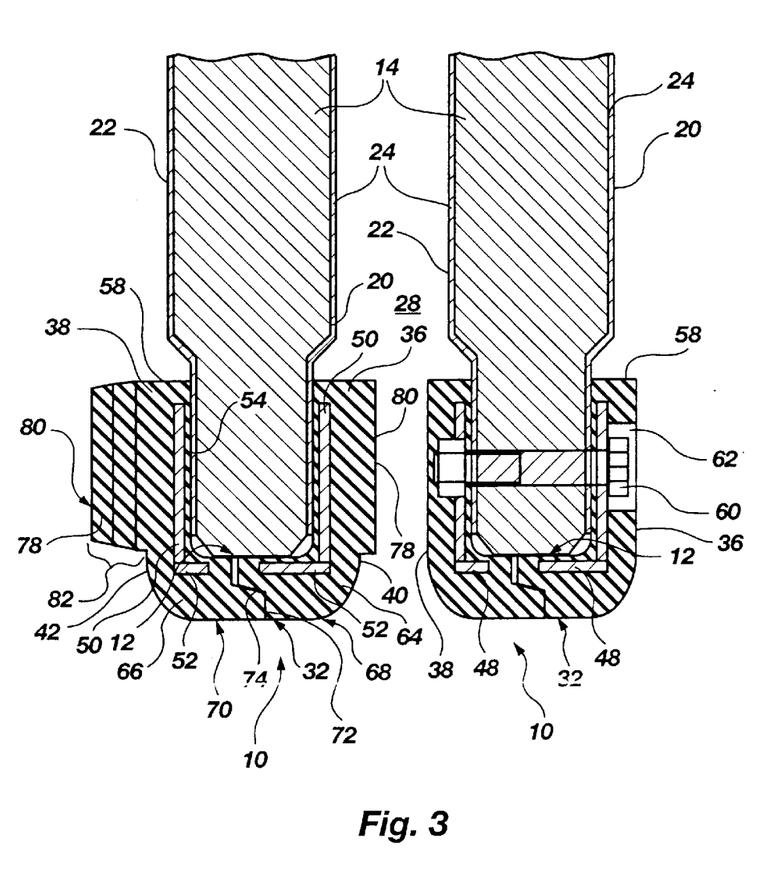
FIG. 3 is a view in cross section of a portion of two adjacent filter plates, one displaying an alternative embodiment of a feed port clamp member, having raised protuberances, positioned about the feed port of the filter plate.

The feed port clamp member 10 is formed from a material which has sufficient hardness to render the feed port clamp member 10 abrasion-resistant. Elastomeric materials may be particularly suitable, particularly those which are also relatively resistant to chemical degradation. The feed port clamp member 10 is formed with a select thickness which imparts strength and substantial rigidity to the feed port clamp member 10. The stability and rigidity of the feed port clamp member 10 are enhanced by reinforcement members 48 associated with the feed port clamp member 10. The reinforcement members 48 may be made of any suitably hard and relatively rigid material which imparts stability to the feed port clamp member 10. Such materials may include stainless steel or other hard metals. As illustrated in FIGS. 2 and 3, the reinforcement members 48 may be positioned within the material of the feed port clamp member 10. Alternatively, the reinforcement members 48 may be positioned external to the abrasion-resistant material of the feed port clamp member 10.

In the embodiment illustrated by FIGS. 2 and 3, the reinforcement members 48 include a first portion 50 which is positioned within the first parallel flange 36 and second parallel flange 38. As shown, the first portion 50 of the reinforcement members 48 may be generally parallel to the flanges 36, 38, although the reinforcement members 48 do not need to be so positioned. In addition, the reinforcement members 48 may include a second portion 52 which is positioned along the circumferential face 32 of the feed port clamp member 10, and the second portion 52 may be oriented at a substantially perpendicular angle to the first portion 50 of the reinforcement members 48. The reinforcement members 48 may be a continuous piece of material (e.g., steel) which is formed as a ring, for example. Alternatively, the reinforced members 48 may be individual portions of material positioned through the feed port clamp member 10.

The inner surface 54 of the feed port clamp member 10 provides a contact surface with the filter media 24 which overlies the first and second sides 20, 22 of the filter plate 14. When the feed port clamp member 10 is secured to the feed port 12 of the filter plate 14, as shown, the first portion 50 of the reinforcement members 48 secures the inner surface 54 of the feed port clamp member 10 against the filter media 24 and a gasket seal 56 is formed about the outer periphery 58 of the feed port clamp member 10 which prevents infiltration of fluid and solids between the feed port clamp member 10 and the filter media 24.

The feed port clamp member 10 may be secured to the feed port 12 of the filter plate 14 by any number of appropriate means including, as shown in FIG. 2, securement members 60 positioned through the first parallel flange 36, through the filter media 24, through the filter plate 14 and through the second parallel flange 38. Such securement members 60 may include rivets, bolts, screws, or any other suitable means. A recess 62 may be formed in the outer surface 40, 42 of the flanges 36, 38 to accommodate the head of a bolt or other securement member 60 so that the securement members 60 lie below the outer surface 40, 42 of the parallel flanges 36, 38. Alternative securement members 60 may include, for example, a U-shaped clip which engages both parallel flanges 36, 38 of the feed port clamp member 10.

The feed port clamp member 10 may be constructed as a unitary member which fits about the feed port 12 of a filter plate 14 as previously described. Alternatively, as shown in FIGS. 2, 3 and 5–7, the feed port clamp member 10 may comprise two interlocking rings 64, 66. Each interlocking ring 64, 66 has a circumferential face 68, 70 with a mateable non-linear edge 72, 74 which is shaped to interlock and engage sealingly with the mateable non-linear edge 72, 74 of the other interlocking ring 64, 66, as shown in FIGS. 2 and 3. The mateable non-linear edges 72, 74 of the interlocking rings 64, 66 provide a secure seal therebetween when the interlocking rings 64, 66 are secured against the filter plate 14 and secured in place by the securement members 60. Therefore, no fluid or solids are able to penetrate between the engaged mateable non-linear edges 72, 74 under high pressure flow conditions. The use of interlocking rings 64, 66 to form the feed port clamp member 10 facilitates attachment of the feed port clamp member 10 to the filter plate 14 and allows reuse of the feed port clamp member 10 when the filter media 24 wears out.

Figure 4:
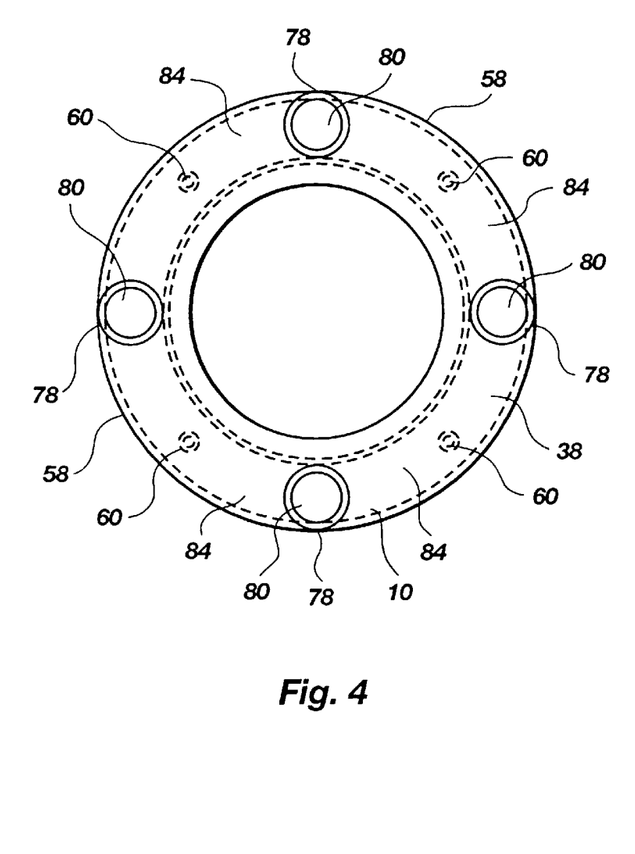
FIG. 4 is a plan view of the feed port clamp member shown in FIG. 3 having raised protuberances.

In an alternative embodiment of the invention shown in FIGS. 3 and 4, the feed port clamp member 10 may be formed with protuberances 78 which extend outwardly from the outer surface of the parallel flanges 36, 38. The protuberances 78 provide a contact surface 80 which is oriented away from the feed port clamp member 10. When filter plates 14 are stacked adjacent one another in a filter press assembly, the protuberances 78 on the feed port clamp member 10 may contact a portion of an adjacent feed port clamp member 10. Alternatively, the protuberance 78 may approach, but not make contact with, the adjacent feed port clamp member 10 until the high pressure flow conditions of operation begin to slightly distort the filter plates 14 so that contact is made between the protuberance 78 of one feed port clamp member 10 and an adjacent feed port clamp member 10, thereby stabilizing the filter plates 14.

Therefore, the height 82 of the protuberance 78 (that is, the distance measured from the outer surface 40, 42 of the parallel flange 36, 38 to the contact surface 80 of the protuberance 78) may vary depending on the intended use and application. The space 84 formed between the protuberances 78 provides a channel along the outer surface 40, 42 of the parallel flanges 36, 38 along which filtration fluid may move into the space 28 formed between adjacent filter plates 14.

Figures 5, 7:
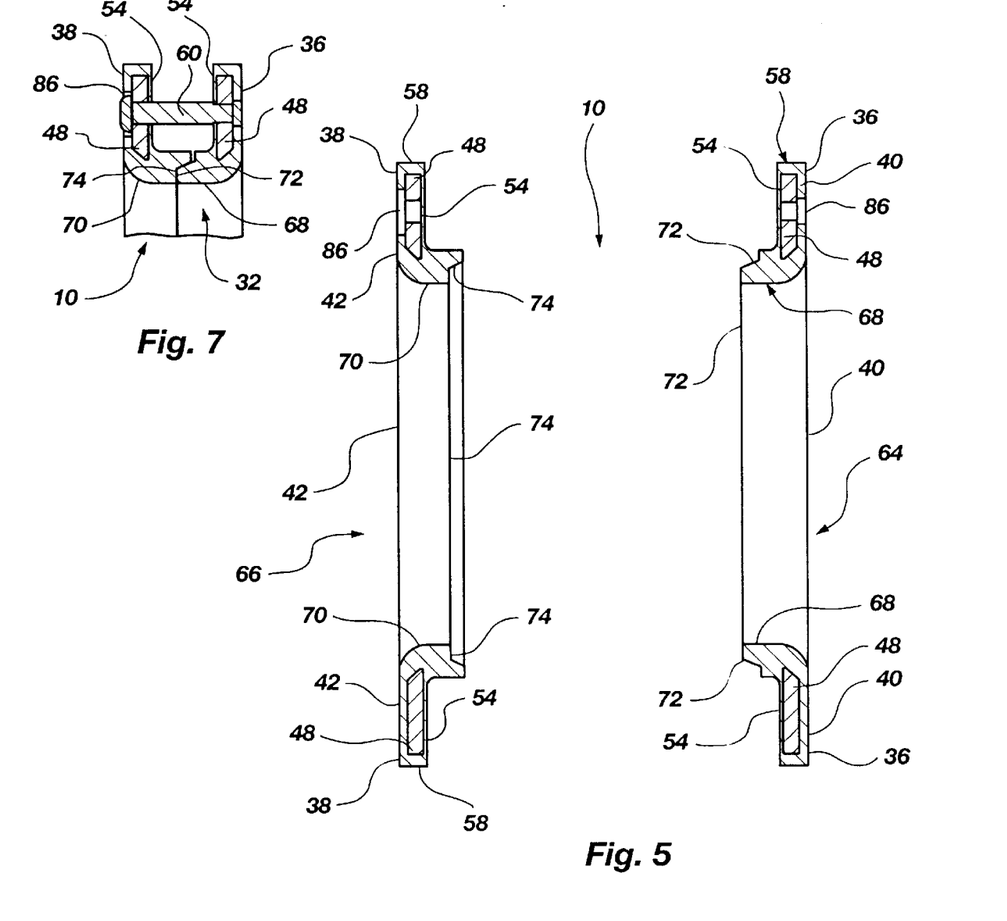
FIG. 5 is a view in cross section of an alternative embodiment of a feed port clamp member illustrating the two interlocking rings.
FIG. 7 is a view in cross section of a portion of the feed port clamp member shown in FIG. 5 illustrating the mateable non-linear edges of the interlocking rings and the securement members securing the two interlocking rings together.
Figure 6:
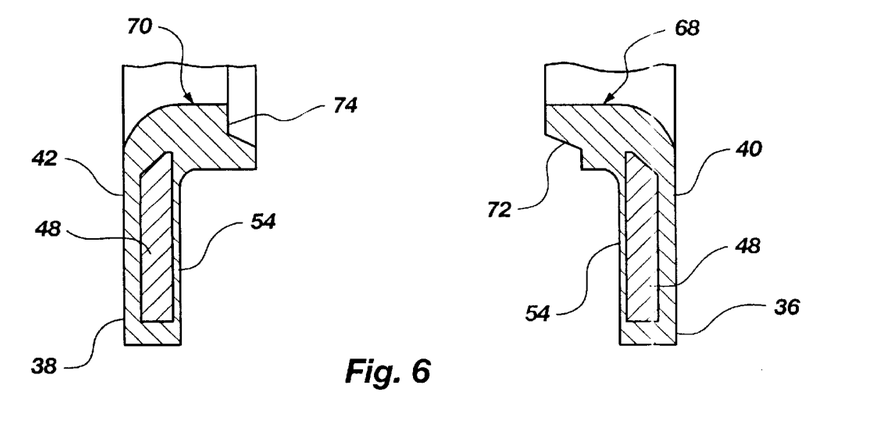
FIG. 6 is an enlarged view in cross section of a portion of the feed port clamp member shown in FIG. 5, illustrating the reinforcement members positioned within the two interlocking rings.
Figure 8:
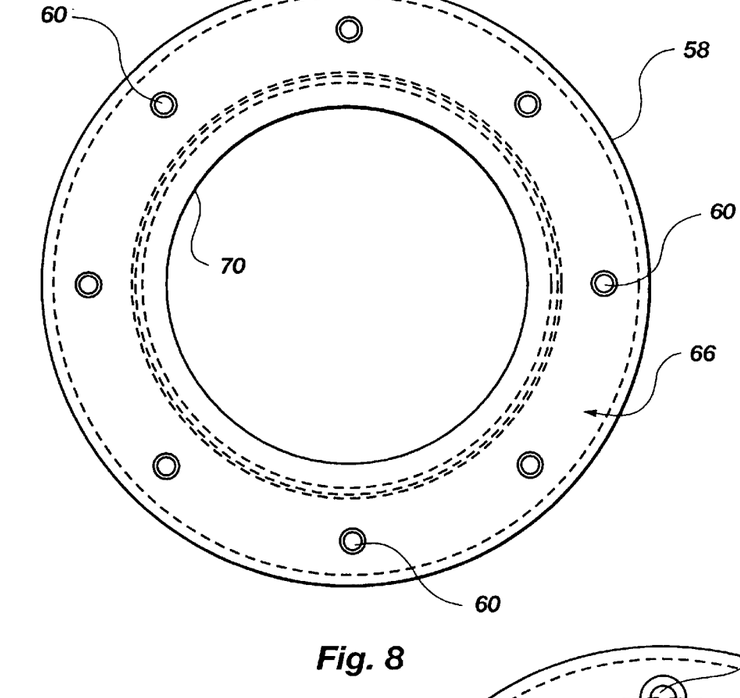
FIG. 8 is a plan view of a first interlocking ring of the feed port clamp member shown in FIG. 5.
Figure 9:
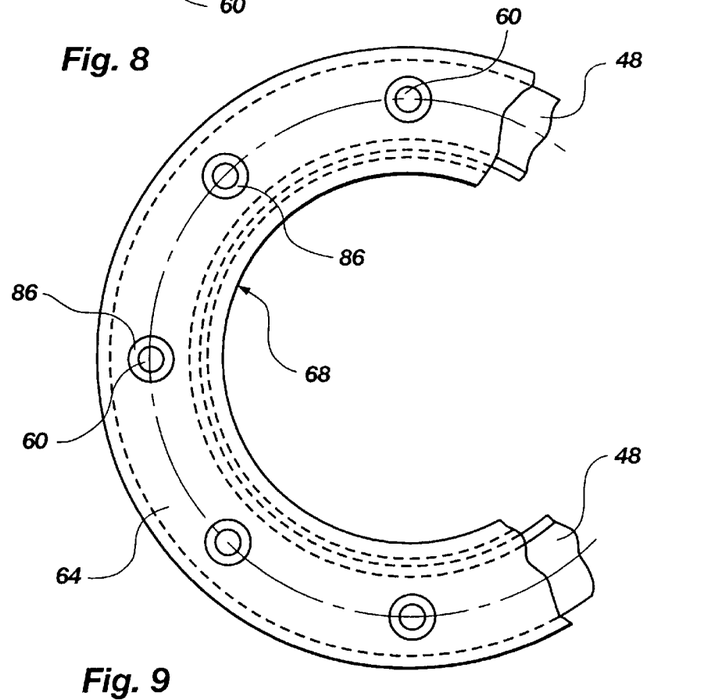
FIG. 9 is a plan view in partial cutaway of a second interlocking ring of the feed port clamp member shown in FIG. 5 illustrating the reinforcement member.

FIGS. 5–9 illustrate an alternative embodiment of the feed port clamp member 10 and illustrate more fully the configuration of the interlocking rings 64, 66 which comprise the feed port clamp member 10. FIG. 5 shows the interlocking rings 64, 66 separated from each other, and the mateable non-linear edges 72, 74 of the interlocking rings 64, 66 can be seen. The embodiment illustrated in FIGS. 5–9 includes a reinforcement member 48 which is formed as a continuous ring of hard material. The reinforcement members 48 are positioned within the flanges 36, 38 of the interlocking rings 64, 66 and are oriented parallel to the outer surface 40, 42 of the interlocking rings 64, 66. FIG. 9 illustrates the placement of the reinforcement member 48 within an interlocking ring 64. An inner surface 54 of abrasion-resistant material (e.g., an elastomer) is positioned against the reinforcement members 48 to provide a secure seal against the filter media 24 (FIG. 1).

As shown in FIGS. 5 and 7–9, an aperture 86 may be preformed through the flanges 36, 38 of the interlocking rings 64, 66 to accommodate the placement of a securement member 60 (e.g., a bolt) therethrough so that the feed port clamp member 10 may be fastened about the feed port 12 of a filter plate 14. FIG. 7 illustrates the interlocking engagement of the mateable edges 72, 74 of the interlocking rings 64, 66, and a securement member 60 securing the interlocking rings 64, 66 together.

Figure 10:
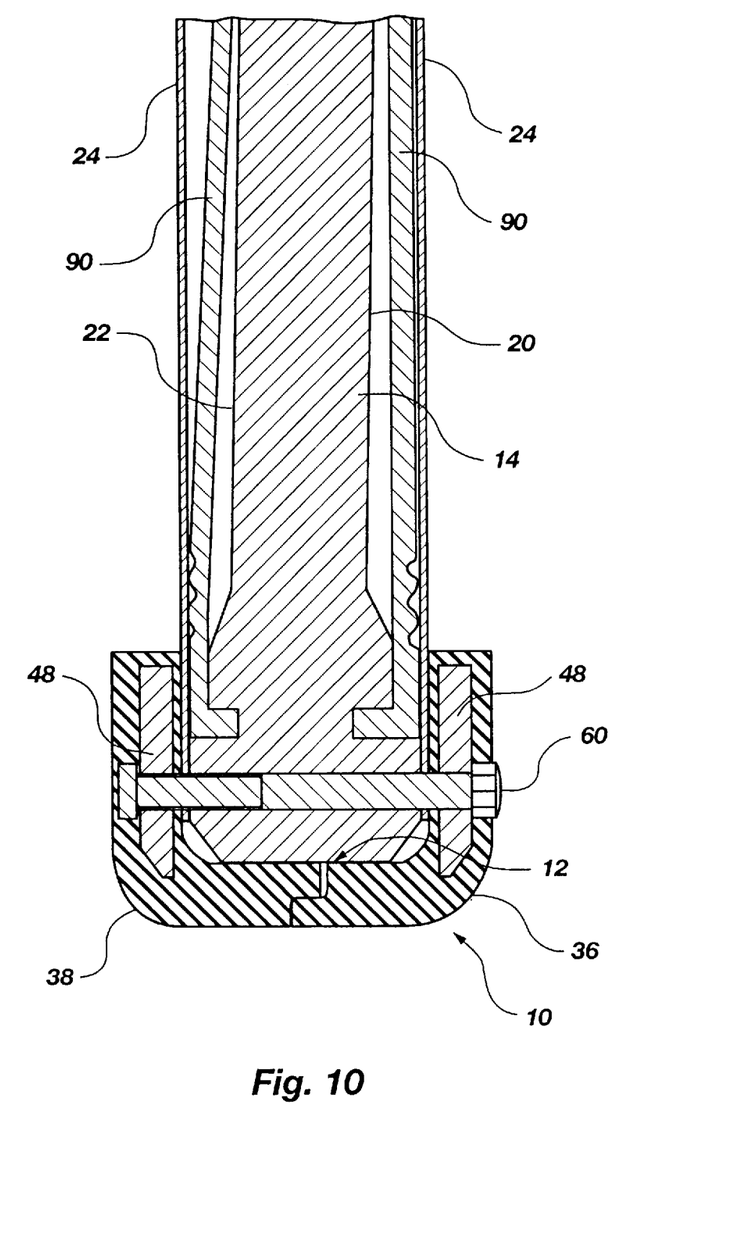
FIG. 10 is a view in cross section of a portion of a membrane plate illustrating positioning of the invention through the feed port thereof.

FIG. 10 illustrates use of the feed port clamp member 10 of the present invention with a membrane plate which generally comprises a substantially planar plate 14 having opposing sides 20, 22 and a resilient membrane 90 positioned against each of the opposing sides 20, 22. In a membrane plate, the filter media 24 is positioned over the membrane 90. The feed port clamp member 10 is positioned through the feed port 12, as previously described, and serves to secure the membrane 90 and the filter media 24 to the filter plate 14. Again, the feed port clamp member 10 prevents undesirable filtration about the area of the feed port clamp member 10 and prevents infiltration of filtration fluid between the feed port clamp member 10 and filter media 24.

The feed port clamp member of the present invention is structured to be abrasion-resistant, to be resistant to chemical degradation, and to encircle the feed port of a filter plate to protect the underlying filter media and filter plate from degradation due to the flow of solids-containing fluids and slurries therethrough. The feed port clamp member is reinforced to provide greater stability and to ensure a secure seal between the feed port clamp member and the underlying filter media. The embodiments described and illustrated herein are exemplar configurations which may be adopted for use in a variety of filter plates, including membrane plates. However, other applications may dictate other relevant embodiments as determinable by those skilled in the art. Hence, reference herein to specific details of the illustrated embodiments is by way of example and not by way of limitation. It will be apparent to those skilled in the art that many additions, deletions and modifications to the illustrated embodiments of the invention may be made without departing from the spirit and scope of the invention as defined by the following claims.

What is claimed is:

1. A feed port clamp for a filter press plate comprising:
a first abrasion-resistant reinforced annular member having an opening defined by a continuous inner circumferential face, a flange oriented substantially perpendicular to said continuous inner circumferential face and extending radially outwardly therefrom, said continuous inner circumferential face having a continuous mateable non-linear edge extending fully about the circumference of said opening; and
a second abrasion-resistant reinforced annular member having an opening defined by a continuous inner circumferential face, a flange oriented substantially perpendicular to said continuous inner circumferential face of said second reinforced annular member and extending radially outwardly therefrom, said continuous inner circumferential face having a continuous mateable non-linear edge extending fully about the circumference of said opening which is interlockingly and sealably mateable with said continuous mateable non-linear edge of said first reinforced annular member to provide a non-linear sealing contact surface therebetween and to form a continuous seal about the circumference of said opening.

2. The feed port clamp of claim 1 wherein said first abrasion-resistant reinforced annular member further includes at least one reinforcement member positioned coextensively therewith, said at least one reinforcement member being oriented parallel to said flange, and wherein said second abrasion-resistant reinforced annular member further includes at least one reinforcement member positioned coextensively therewith, said at least one reinforcement member being oriented parallel to said flange of said second abrasion-resistant reinforced annular member.

3. The feed port clamp of claim 2 wherein said at least one reinforcement member of said first abrasion-resistant reinforced annular member further includes a portion which is oriented parallel to said continuous inner circumferential face thereof, and further wherein said at least one reinforcement member of said second abrasion-resistant reinforced annular member further includes a portion which is oriented parallel to said continuous inner circumferential face thereof.

4. The feed port clamp of claim 2 further including a plurality of securement members positioned through said flange of said first abrasion-resistant reinforced annular member and through said flange of said second abrasion-resistant reinforced annular member.

5. The feed port clamp of claim 4 wherein said flange of said first abrasion-resistant reinforced annular member and said flange of said second abrasion-resistant reinforced annular member each have an inner gasket surface.

6. The feed port clamp of claim 5 wherein said flange of said first abrasion-resistant reinforced annular member and said flange of said second abrasion-resistant reinforced annular member each have an outer surface forming a continuous, non-linear surface with said continuous inner circumferential face.

7. The feed port clamp of claim 6 wherein at least one of said outer surfaces has at least one protuberance extending outwardly from said outer surface.

8. The feed port clamp of claim 6 wherein said first abrasion-resistant reinforced annular member and said second abrasion-resistant reinforced annular member are made of an elastomeric material.

9. A filter plate comprising:
a substantially planar plate having a first recessed surface and an opposing second recessed surface spaced apart from said first recessed surface defining a thickness therebetween and a feed port opening formed through said thickness of said substantially planar plate;

porous filter media positioned against said first recessed surface and against said second recessed surface and positioned to surround said feed port opening; and an annular reinforced feed port clamp of abrasion-resistant material, said annular reinforced feed port clamp having a continuous, non-passaging circumferential face positioned through said feed port opening which extends continuously from said first recessed surface to said second recessed surface through said thickness therebetween and at all points about the circumference of said feed port opening to provide a secure seal against fluid infiltration of said circumferential face, said annular reinforced feed port clamp further comprising a first annular member having a first continuous circumferential face portion with a mateable non-linear edge and a first flange extending substantially perpendicular to and radially outwardly from said first continuous circumferential face portion and positioned against said porous filter media positioned against said first recessed surface, and a second annular member having a second continuous circumferential face portion with a mateable non-linear edge and a second flange extending substantially perpendicular to and radially outwardly from said second continuous circumferential face portion and positioned against said porous filter media positioned against said second recessed surface, said mateable non-linear edge of said first continuous circumferential face portion and said mateable non-linear edge of said second continuous circumferential face portion being in sealable engagement with one another to provide a non-linear sealing contact surface therebetween, and said annular reinforced feed port clamp being secured to said planar plate by a plurality of attachment members positioned through said first flange, through said thickness of said planar plate and through said second flange; and an embedded reinforcement member positioned in parallel alignment with, and being substantially radially co-extensive with, each said first flange and said second flange.

10. The filter plate of claim 9 wherein said first flange and said second flange each have an inner surface positioned against said porous filter media forming a gasket seal between said annular reinforced feed port clamp and said porous filter media.

11. The filter plate of claim 9 wherein said embedded reinforcement member of said annular reinforced feed port clamp further extends therethrough in parallel alignment with, and substantially coextensive with, said continuous circumferential face.

* * * * *

UNITED STATES PATENT AND TRADEMARK OFFICE
CERTIFICATE OF CORRECTION

PATENT NO : 5,851,387
DATED : December 22, 1998
INVENTOR(S) : Reuben G. Neumann

It is certified that error appears in the above-identified patent and that said Letters Patent is hereby corrected as shown below:

On the title page, under "[56] References Cited, U.S. PATENT DOCUMENTS", in the first reference (3,087,298), column 2, change "4/1963" to --4/1974--;

On the title page, under "[56] References Cited, FOREIGN PATENT DOCUMENTS", in the first reference (33942), column 3, change "Australia" to --Austria--;

On the title page, under "[56] References Cited, FOREIGN PATENT DOCUMENTS", in the fourth reference (975662), column 2, change "11/1984" to --11/1964--.

Signed and Sealed this

Seventh Day of September, 1999

*Attest:*

Q. TODD DICKINSON

*Attesting Officer*  *Acting Commissioner of Patents and Trademarks*